United States Patent
Harikumar et al.

(10) Patent No.: US 7,987,352 B2
(45) Date of Patent: Jul. 26, 2011

(54) BOOTING WITH SUB SOCKET PARTITIONING

(75) Inventors: Ajay Harikumar, Bangalore (IN); Tessil Thomas, Bangalore (IN); Biju P. Simon, Bangalore (IN); Kiran S. Panesar, Kamataka (IN)

(73) Assignee: Intel Corporation, Santa Clara, CA (US)

( * ) Notice: Subject to any disclaimer, the term of this patent is extended or adjusted under 35 U.S.C. 154(b) by 907 days.

(21) Appl. No.: 11/948,309

(22) Filed: Nov. 30, 2007

(65) Prior Publication Data

US 2009/0144531 A1 Jun. 4, 2009

(51) Int. Cl.
*G06F 15/177* (2006.01)
(52) U.S. Cl. .................................. 713/2; 713/1
(58) Field of Classification Search .................. 713/1, 2
See application file for complete search history.

(56) References Cited

U.S. PATENT DOCUMENTS

| | | | | |
|---|---|---|---|---|
| 7,472,266 | B2 * | 12/2008 | Kumar et al. | 713/1 |
| 7,779,244 | B2 * | 8/2010 | Zimmer et al. | 713/2 |
| 2008/0028408 | A1 * | 1/2008 | Day et al. | 718/104 |
| 2008/0120490 | A1 * | 5/2008 | Brown | 712/216 |
| 2008/0134191 | A1 * | 6/2008 | Warrier et al. | 718/104 |

* cited by examiner

*Primary Examiner* — Dennis M Butler
(74) *Attorney, Agent, or Firm* — Buckley, Maschoff & Talwalkar LLC

(57) ABSTRACT

A method of booting up a computer system comprising a first multi-cored processor comprising a first plurality of cores and a second multi-cored processor comprising a second plurality of cores is disclosed. The method may comprise configuring a first partition comprising a first one or more cores from the first plurality of cores and from the second plurality of cores, configuring a second partition comprising a second one or more cores from the first plurality of cores and from the second plurality of cores, and configuring a third partition comprising a third one or more cores from the first plurality of cores and one or more cores from the second plurality of cores.

9 Claims, 2 Drawing Sheets

200

Configure a first partition comprising a first one or more cores from the first plurality of cores and a second one or more cores from the second plurality of cores
201

Configure a second partition comprising a third one or more cores from the first plurality of cores
202

Configure a third partition comprising a fourth one or more cores from the second plurality of cores
203

FIG. 2

BOOTING WITH SUB SOCKET PARTITIONING

BACKGROUND

An operating system controls low-level computer system functions. Numerous operating systems are currently available. For example, a first computer system may execute a UNIX-based operating system while a second computer system may execute a Windows-based operating system.

It may be desirable to allow a single computer system to concurrently execute more than one operating system. The single computer system may execute emulation software that allows a second operating system to be executed over a first operating system. However, emulation software may degrade system performance and consume significant resources.

BRIEF DESCRIPTION OF THE DRAWINGS

FIG. 2 illustrates a method according to some embodiments.

DETAILED DESCRIPTION

Figure 1:
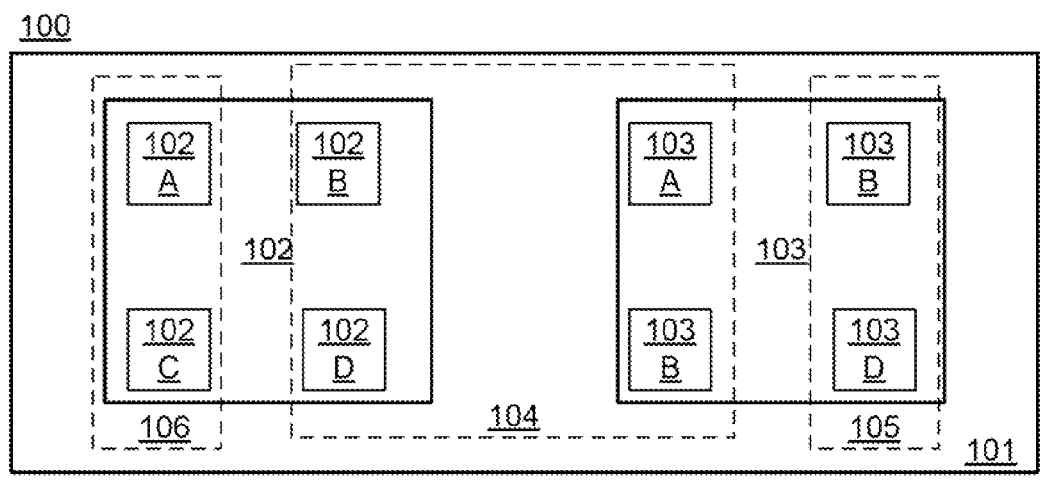
FIG. 1 illustrates an apparatus according to some embodiments.

The several embodiments described herein are solely for the purpose of illustration. Embodiments may include any currently or hereafter-known versions of the elements described herein. Therefore, persons in the art will recognize from this description that other embodiments may be practiced with various modifications and alterations.

A computer system comprising multi-cored processors may execute multiple operating systems. Such execution may allow for computer system consolidation and provide the ability to run a service (i.e. support related) operating system in parallel with a main operating system. Each operating system may execute on a separate partition where each partition comprises one or more cores. Memory (e.g. main memory and cache), input and output resources ("I/O"), and asynchronous events (e.g. interrupt, reset) may be divided across each partition for simultaneous execution of multiple operating systems.

Now referring to FIG. 1, an embodiment of an apparatus 100 is illustrated. Apparatus 100 may comprise a dual processor computer system 101 that comprises a first processor 102 and a second processor 103. Each processor 102/103 may comprise N cores, where N is an integer greater than 1. In the illustrated embodiment, each processor 102/103 comprises four cores 102A/102B/102C/102D/103A/103B/103C/103D, however each processor 102/103 may comprise any number of cores. Each of processor cores 102A/102B/102C/102D/103A/103B/103C/103D may function as a boot strap processor ("BSP") and/or as an application processors ("AP"), and each core 102A/102B/102C/102D/103A/103B/103C/103D may comprise an associated boot firmware.

Each processor 102/103 may comprise an associated bank of cache memory and processor 102 may be connected to processor 103 by either a ring interconnect or a two-dimensional mesh/cross bar according to a die interconnect protocol. Each bank of cache memory may comprise a controller and in some embodiments a memory controller may be integrated into each processor.

When a boot process begins, each processor 102/103 may select a core 102A/102B/102C/102D/103A/103B/103C/103D/ to act as a Node Boot Strap Processor ("NBSP") and runs a pre Extensible Firmware Interface ("pre-EFI") Firmware (for example, Tiano BIOS PEI stage) initialization where each NBSP may discover and initialize any remaining cores 102A/102B/102C/102D/103A/103B/103C/103D/ in the processor 102/103 and any memory associated with the processors 102/103. Once an NSBP is selected for each processor 102/103, each NBSP may participate in a System BSP ("SBSP") selection and one NBSP may be selected to serve as an SBSP. The other NBSPs go into a wait state till the SBSP wakes them up.

After the SBSP is selected, the SBSP starts the PCI enumeration stage (This is part of the Driver eXecution Environment ("DXE") stage in current Tiano BIOS) that identifies and quantifies the PCI and other system resources such as, but not limited to I/O resources. The SBSP builds a plurality of resource tables as part of the resource discovery process. By enumerating system resources in this manner, the SBSP may have knowledge of all available resources in the system 101. The SBSP may receive information indicating the number of cores 102A/102B/102/C/102D/103A/103B/103C/103D associated with apparatus 100 and an amount of available memory associated with each processor 102/103 from the plurality of resource tables.

After the system resources are enumerated, an Active Partition Manager ("APM") may be loaded. The APM may be responsible for dividing the apparatus 100 into a plurality of partitions after the system resources are loaded. An APM may configure the apparatus 100 during boot up, allocate cores and associated memory, de-allocate cores and associated memory during runtime, and handle error flow for shared resources during runtime. In some embodiments the APM may be implemented in firmware and may be accessed via an EFI call by a plurality of partitions, where EFI may comprise a runtime layer/interface between an operating system and a platform firmware executing an operating system. EFI may comprise data tables that contain platform specific information, boot and runtime service calls available to the operating system, and loader information.

The APM may obtain information associated with the number of required partitions and an amount of resources to be associated with each partition. In some embodiments, the amount of resources to be assigned to each partition may be based on stored configuration files such as one or more partition configuration tables ("PCT"). In some embodiments, the configuration files may be stored in an EEPROM, flash memory, or may be hard-coded in BIOS. A PCT may include various parameters that define a number of partitions, an initial set of cores belonging to each partition, an initial memory allocation associated with each partition, a priority level of each partition associated with memory allocation, a chip port bandwidth allocation, and a cache sharing priority.

Once a PCT is read by the SBSP, the APM may partition the plurality of cores 102A/102B/102/C/102D/103A/103B/103C/103D by programming a plurality of common system interconnect ("CSI", also known as QuickPath) links, SADs (System Address Decoders), TADs (Target Address Decoders), Partition Base Addresses ("PBA"), and Partition ID registers in various cores and I/O devices using the information from PCT.

The APM may divide the plurality of cores 102A/102B/102C/102D/103A/103B/103C/103D associated with the processors 102/103 into a plurality of partitions or may choose to not associate resources including cores, memory and IO devices with any of the partitions. Each partition may comprise one or more cores. For example, apparatus 100 may be divided into a plurality of partitions such as first partition 106, second partition 105 and third partition 104. The first partition 106 may comprise cores 102A and 102C, the second partition 105 may comprise cores 103B and 103D, and the third partition 104 may comprise cores 102B, 102D, 103A and 103B. In some embodiments, the first partition 104, the second partition 105, and/or the third partition 106 may either execute a first, second or third respective operating system or may function as an administrative or service partition.

Some partitions may have greater access to the APM than other partitions. For example an administrative partition might have extensive access to the APM while a partition executing an operating system might have limited access.

The APM may also create a hand-off block ("HOB") list per partition. An HOB is a data list that describes system resources and is handed over from a pre EFI initialization stage to a DXE stage in Tiano. Creating one HOB per partition may mean that a DXE stage associated with a respective partition may use a respective HOB list to configure the resources associated with the respective partition where the resources comprise memory, cores and PCI devices. During partitioning, some cores may be held in a wait for Startup IPI ("SIPI") state. Alternatively, the above initialization may be performed by a system support processor ("SSP"). In some embodiments, SIPIs may be issued to wake up all the cores in the system.

A partition boot strap processor ("PBSP") to be associated with each partition may be selected based on a semaphore win among all the cores belonging to each partition. A non PBSP may execute until a rendezvous point in firmware and may wait in a SIPI loop until the PBSP finishes executing a DXE stage and the boot device selection ("BDS") stage where the BDS is a last stage prior to a handoff to an operating system. In some embodiments, the PBSP may be associated with Tiano firmware that utilizes an extensible firmware interface. Each partition may comprise firmware and each associated firmware may comprise a corresponding HOB list as mentioned above. Drivers associated with resources discovered in the DXE stage may be executed based on the resource list enumerated in a respective HOB.

Once each of the partitions, 104, 105 and 106 belonging to the apparatus 100 have booted up, a hand off may be performed by each partition to an operating system. The boot firmware associated with any core 102A/102B/102C/102D/103A/103B/103C/103D that is not associated with any partition may execute an mwait command and go to a low power such as but not limited to C6. The unallocated core may not be associated with any one partition and may be associated with the Active Partition Manager. These unallocated cores could be used to dynamically create a new fourth partition later in time after the three partitions are created.

Unallocated portions of the memory may be set to a self refresh state. A partition memory allocation map may be maintained for further use by the APM for dynamic allocation and de-allocation of memory to the one or more partitions 104/105/106 or for creating a new partition. A system processor and resource allocation map may be maintained for further use by the APM for dynamic allocation and de-allocation of cores and resources. The I/O resources may be virtualized or partitioned (by duplication) as known in the art in traditional hard/firm partitioned systems.

Now referring to FIG. 2, an embodiment of a method 200 is illustrated. Method 200 may be executed by any combination of hardware, software, and firmware, including but not limited to the apparatus 100 of FIG. 1. Some embodiments of method 200 may be executed during a boot up of a computer system comprising a first multi-cored processor comprising a first plurality of cores and a second multi-cored processor comprising a second plurality of cores.

At 201, a first partition comprising a first one or more cores from the first plurality of cores and a second one or more cores from the second plurality of cores is configured. The first partition may comprise one or more cores from both first processor 102 and second processor 103 as illustrated by first partition 104 of FIG. 1. The first partition may comprise a first number of cores and a first number of available system resources and may be configured by an APM. In some embodiments, the available system resources may comprise the first plurality of cores, the second plurality of cores, memory, and input output resources.

Next, at 202, a second partition comprising a third one or more cores from the first plurality of cores is configured. The second partition may comprise one or more cores as illustrated by first partition 105 of FIG. 1. The second partition may comprise a second number of cores and a second number of available system resources. The second partition may also be configured by the APM. In some embodiments, the second partition may comprise one or more cores from the first plurality of cores and one or more cores from the second plurality of cores.

At 203, a third partition comprising a fourth one or more cores from the second plurality of cores is configured. The third partition may comprise one or more cores as illustrated by third partition 106 of FIG. 1. The third partition may comprise a third number of cores and a third number of available system resources. The second partition may also be configured by the APM. In some embodiments, the third partition may comprise one or more cores from the first plurality of cores and one or more cores from the second plurality of cores.

An extensible firmware interface may configure the first partition, the second partition, and the third partition. The configuration may comprise initializing the first multi-cored processor via a first node bootstrap processor, initializing the second multi-cored processor via a second node bootstrap processor, and selecting either the first node boot strap processor or the second node boot strap processor to operate as a system node boot strap processor.

Configuring may also comprise executing a pre-EFI initialization, enumerating the computer systems resources, storing data associated with the enumerated resources in a table, and partitioning the enumerated resources into the first partition, the second partition and the third partition based on the table. A pre EFI initialization may perform basic platform initialization, executed from non-volatile memory (e.g. flash memory) as known in the art. In some embodiments, the enumeration may be associated with a DXE stage and control may pass to the DXE stage after the pre-EFI initialization has been completed, where the DXE stage performs higher-level platform initialization and diagnostics.

After the first partition, the second partition, and the third partition are configured, a first operating system may be loaded on the first partition, a second operating system may be loaded on the second partition, a third operating system may be loaded on the third partition.

In some embodiments, one or more cores from the first plurality of cores or the second plurality of cores may be de-allocated from an associated partition at runtime. The de-allocated cores may be re-allocated to the first partition, the second partition, the third partition, or to a new dynamically created fourth partition.

Various modifications and changes may be made to the foregoing embodiments without departing from the broader spirit and scope set forth in the appended claims.

What is claimed is:

1. A method of booting up a computer system comprising a first multi-cored processor comprising a first plurality of cores and a second multi-cored processor comprising a second plurality of cores, the method comprising:
    initializing the first multi-cored processor via a first node bootstrap processor;
    initializing the second multi-cored processor via a second node bootstrap processor;
    selecting the first node boot strap processor to operate as a system node boot strap processor;
    configuring, by the system node boot strap processor, a first partition comprising a first one or more cores from the first plurality of cores and a second one or more cores from the second plurality of cores;
    configuring, by the system node boot strap processor, a second partition comprising a third one or more cores from the first plurality of cores; and
    configuring, by the system node boot strap processor, a third partition comprising a fourth one or more cores from the second plurality of cores in the second multi-cored processor.

2. The method of claim 1, wherein configuring the first partition, the second partition, and the third partition is via a Extensible Firmware Interface (EFI).

3. The method of claim 2, further comprising:
    executing a pre EFI initialization;
    enumerating the computer systems resources;
    storing data associated with the enumerated resources in a table accessible by both the first multi-cored processor and the second multi-cored processor; and
    partitioning the enumerated resources into the first partition, the second partition and the third partition based on the table.

4. The method of claim 3, wherein the system resources comprise all of the first plurality of cores, the second plurality of cores, memory, and input output resources.

5. The method of claim 4, further comprising:
    loading a first operating system on the first partition;
    loading a second operating system on the second partition; and
    loading a third operating system on the third partition.

6. The method of claim 5, further comprising:
    de-allocating one or more cores from the first plurality of cores or the second plurality of cores at runtime; and
    re-allocating the de-allocated cores to the first partition, the second partition, the third partition or a new dynamically created fourth partition.

7. An apparatus comprising:
    a first multi-cored processor comprising a first plurality of cores;
    a second multi-cored processor comprising a second plurality of cores, wherein when booted:
    initialize the first multi-cored processor via a first node bootstrap processor,
    initialize a second multi-cored processor via a second node bootstrap processor,
    select the first node boot strap processor to operate as a system node boot strap processor,
    configure, via an Extensible Firmware Interface, a first partition comprising a first one or more cores from the first plurality of cores and a second one or more cores from the second plurality of cores,
    configure a second partition comprising a third one or more cores from the first plurality of cores, and
    configure a third partition comprising a fourth one or more cores from the second plurality of cores in the second multi-cored processor.

8. The apparatus of claim 7, wherein configuring the first partition, the second partition, and the third partition further comprises:
    executing a pre EFI initialization;
    enumerating the computer systems resources;
    storing data associated with the enumerated resources in a table accessible by both the first multi-cored processor and the second multi-cored processor; and
    partitioning the enumerated resources into the first partition, the second partition and the third partition based on the table.

9. The apparatus of claim 8, wherein a first operating system is loaded on the first partition; a second operating system is loaded on the second partition, and a third operating system is loaded on the third partition.

* * * * *